(12) United States Patent
Doubler et al.

(10) Patent No.: US 8,251,620 B2
(45) Date of Patent: Aug. 28, 2012

(54) METHOD AND SYSTEM TO MANUFACTURE ORIENTED INTERNAL AND EXTERNAL GEAR TEETH

(75) Inventors: Stephen D. Doubler, Saline, MI (US); Jeffrey R. Lee, Tipton, MI (US); Travis M. Thompson, Ann Arbor, MI (US); Richard Vriesen, LaSalle (CA); Scott L. Yoders, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1203 days.

(21) Appl. No.: 12/027,357

(22) Filed: Feb. 7, 2008

(65) Prior Publication Data
US 2008/0213054 A1  Sep. 4, 2008

Related U.S. Application Data

(60) Provisional application No. 60/892,708, filed on Mar. 2, 2007.

(51) Int. Cl.
*B23F 1/08* (2006.01)
*B23F 23/08* (2006.01)

(52) U.S. Cl. .......... 409/2; 409/59; 409/60; 409/61; 409/6; 409/246; 409/250; 409/270; 409/278

(58) Field of Classification Search .......... 409/2, 58–59, 409/61, 60, 42, 6–7, 245–246, 250, 256, 409/259, 264, 269–270, 272, 278
See application file for complete search history.

(56) References Cited

U.S. PATENT DOCUMENTS

| 2,257,195 | A | * | 9/1941 | Rovick | 409/31 |
| 2,504,578 | A | * | 4/1950 | Pelphrey | 409/33 |
| 2,522,712 | A | * | 9/1950 | Gotberg | 409/59 |
| 3,762,270 | A | * | 10/1973 | Anthony et al. | 409/7 |
| 7,402,011 | B2 | * | 7/2008 | Thompson et al. | 409/256 |
| 2006/0257221 | A1 | * | 11/2006 | Taki et al. | 409/6 |
| 2008/0052894 | A1 | * | 3/2008 | Thompson et al. | 29/558 |
| 2011/0262239 | A1 | * | 10/2011 | Tokawa et al. | 409/34 |

FOREIGN PATENT DOCUMENTS

| JP | 06-226534 | A | * | 8/1994 |
| JP | 06-254719 | A | * | 9/1994 |

* cited by examiner

*Primary Examiner* — Erica E Cadugan

(57) ABSTRACT

A system and method for forming a feature on an inner surface of a gear includes a sensor for sensing the position of a feature on the gear, a cutting station having a cutting tool for forming the feature on the inner surface of the gear, and a controller. The controller is operable to determine an amount of rotation necessary to rotate either the gear or the cutting tool such that the feature on the inner surface of the gear is formed at a desired orientation relative to the feature on the outer surface of the gear.

10 Claims, 6 Drawing Sheets

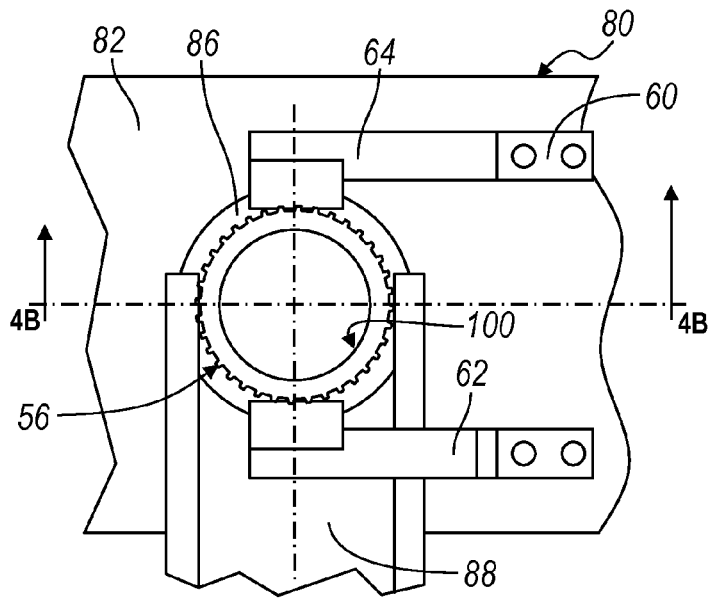
FIG. 4A
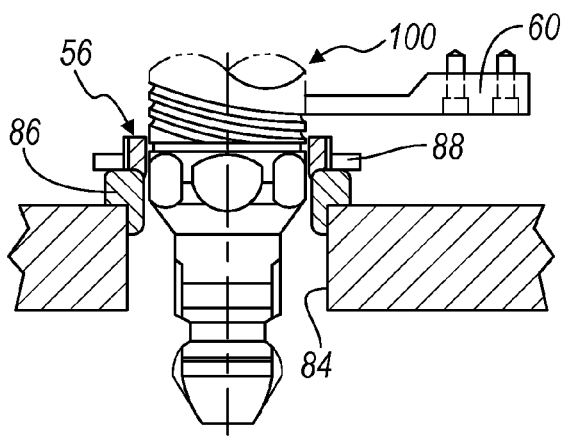
FIG. 4B
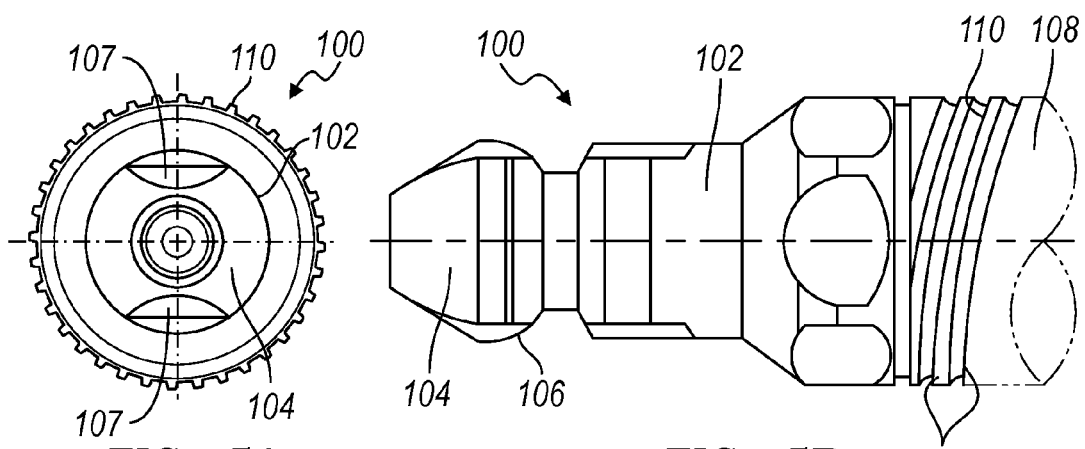
FIG. 5A
FIG. 5B

Third Control Logic for Rotating at least one of the Cutting Edge and the Gear

FIG. 7

The Feature on the Outer Surface of the Gear is at least one of a Spline and a Gear Tooth, and the Feature on the Inner Surface of the Gear is at least one of a Spline and a Gear Tooth

FIG. 8

METHOD AND SYSTEM TO MANUFACTURE ORIENTED INTERNAL AND EXTERNAL GEAR TEETH

CROSS-REFERENCE TO RELATED APPLICATIONS

This application claims the benefit of U.S. Provisional Application No. 60/892,708 filed on Mar. 2, 2007. The disclosure of the above application is incorporated herein by reference.

FIELD

The present disclosure relates to gears, and more particularly to a method and system to manufacture oriented internal and external gear members.

BACKGROUND

The statements in this section merely provide background information related to the present disclosure and may or may not constitute prior art.

A typical internal ring gear includes a set of outer diameter spline teeth and a set of inner diameter gear teeth. The spine teeth are formed on an outer surface of the ring gear while the gear teeth are formed on an inner diameter of the ring gear. These internal ring gears are used in various environments, many of which require a specific orientation between the outer diameter spline teeth and the inner diameter gear teeth.

In order to meet high volume demands, internal ring gears that have outside diameter spline teeth and internal diameter gear teeth are typically manufactured using a method wherein both the spline teeth and the gear teeth are broached on a cutting machine. However, manufacturing systems that utilize this method have not been capable of producing a gear in which the gear teeth have a specific orientation relative to the spline teeth. Accordingly, there is room in the art for an improved gear manufacturing system capable of orienting the inner diameter gear teeth with the outer diameter spline teeth.

SUMMARY

A system and method for forming a feature on an inner surface of a gear is provided. The system and method include a sensor for sensing the position of a feature on the gear, a cutting station having a cutting tool for forming the feature on the inner surface of the gear, and a controller. The controller is operable to determine an amount of rotation necessary to rotate either the gear or the cutting tool such that the feature on the inner surface of the gear is formed at a desired orientation relative to the feature on the outer surface of the gear.

One embodiment of the system of the present invention includes a cutting device having a cutting edge for forming the feature in the inner surface of the gear, a sensor for detecting a feature on an outer surface of the gear, and a controller in communication with the sensor and the cutting device. The controller has a first control logic for determining the angular orientation of the feature on the outer surface of the gear with respect to the cutting edge, a second control logic for determining an amount of rotation required to position the cutting edge and the feature on the outer surface of the gear at a desired orientation, a third control logic for rotating at least one of the cutting edge and the gear the amount required to orient the cutting edge and the gear to the desired orientation, and a fourth control logic to move the cutting edge through the gear such that the cutting edge forms at least one feature into the inner surface of the gear. The feature on the inner surface is positioned relative to the feature on the outer surface at the desired orientation.

In one aspect of the present invention, the cutting edge is rotated relative to the gear in order to orient the cutting edge relative to the feature on the outer surface of the gear to the desired orientation.

In another aspect of the present invention, the cutting edge is located on a cutting tool, the cutting tool having a flat portion positioned at a fixed orientation relative to the cutting edge, and the first control logic determines the angular orientation of the feature on the outer surface of the gear with respect to the cutting edge by determining the orientation of the flat portion with respect to the feature on the outer surface of the gear, and the second control logic determines the amount of rotation required to position the cutting edge and the feature on the outer surface of the gear at the desired orientation by using the fixed orientation of the flat portion relative to the cutting edge to the amount of rotation.

In yet another aspect of the present invention, the cutting device includes a base having a hole sized to receive the cutting tool therethrough, and the sensor is connected to the cutting device proximate the hole.

In yet another aspect of the present invention, the system includes an orientation device having an extendable hub, wherein the extendable hub is operable to contact the gear and rotate the gear relative to the cutting device the amount of rotation required to orient the gear with respect to the cutting edge.

In yet another aspect of the present invention, the sensor is connected to the orientation device.

In yet another aspect of the present invention, the system includes a loader having a toothed portion operable to engage the feature on the outer surface of the gear, wherein the loader is operable to move the gear from the orientation device to the cutting device while maintaining the orientation of the gear relative to the cutting device.

In yet another aspect of the present invention, the desired orientation is measured from a center of the feature on the outer surface of the gear to the cutting edge.

In yet another aspect of the present invention, the desired orientation is an angle between a radial line extending from a center of the gear to the center of the feature on the outer surface of the gear and a radial line extending from the center of the gear to a center of the feature on the inner surface of the gear.

In yet another aspect of the present invention, the feature on the outer surface of the gear is at least one of a spline and a gear tooth and wherein the feature on the inner surface of the gear is at least one of a spline and a gear tooth.

One embodiment of the method of the present invention includes the steps of determining the position of an outer feature on an outer surface of the gear relative to a feature on a cutting tool, determining an amount of rotation required to position the outer feature of the gear relative to the feature on the cutting tool at a desired orientation, rotating at least one of the gear and the cutting tool the amount of rotation required to position the outer feature of the gear relative to the feature on the cutting tool at the desired orientation, and moving the cutting tool through the gear such that the cutting tool forms the inner feature into the inner surface of the gear.

In one aspect of the present invention, the feature on the cutting tool is a cutting edge, and wherein the cutting edge cuts the inner feature into the gear as the cutting tool is moved through the gear.

In another aspect of the present invention, the desired orientation is an angle between a radial line extending from a center of the gear to the center of the outer feature of the gear and a radial line extending from the center of the gear to a center of the inner feature of the gear.

In yet another aspect of the present invention, the location of the outer feature is determined by sensing the location of the outer feature using a sensor.

In yet another aspect of the present invention, the step of rotating at least one of the gear and the cutting tool includes the step of rotating the cutting tool and rotationally fixing the gear.

In yet another aspect of the present invention, the step of rotating at least one of the gear and the cutting tool includes the step of rotating the gear and rotationally fixing the cutting tool.

In yet another aspect of the present invention, the gear is rotated by an orientation device having an extendable hub, wherein the hub extends into the gear and rotates the gear to the amount of rotation required to position the outer feature of the gear relative to the feature on the cutting tool at the desired orientation.

In yet another aspect of the present invention, the method includes the step of positioning the gear underneath the cutting tool after the gear has been rotated.

In yet another aspect of the present invention, the gear is positioned underneath the cutting tool using a loader having splines operable to engage the outer feature in order to prevent the gear from rotating during the step of positioning the gear underneath the cutting tool.

In yet another aspect of the present invention, the feature on the cutting tool is a flat portion.

In yet another aspect of the present invention, the outer feature is at least one of a spline and a gear tooth and wherein the inner feature is at least one of a spline and a gear tooth.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4A is an enlarged top schematic view of a cutting station employed in the gear cutting system of the present invention;

FIG. 4B is a side schematic view of the cutting station;

FIG. 5A is an enlarged bottom schematic view of a broach tool used in the cutting station;

FIG. 5B is a side schematic view of the broach tool;

FIG. 7 is a schematic representation of a control logic.

FIG. 8 is a schematic representation of embodiments of features on the outer and inner gear surfaces.

DETAILED DESCRIPTION

The following description is merely exemplary in nature and is not intended to limit the present disclosure, application, or uses.

Figure 1:
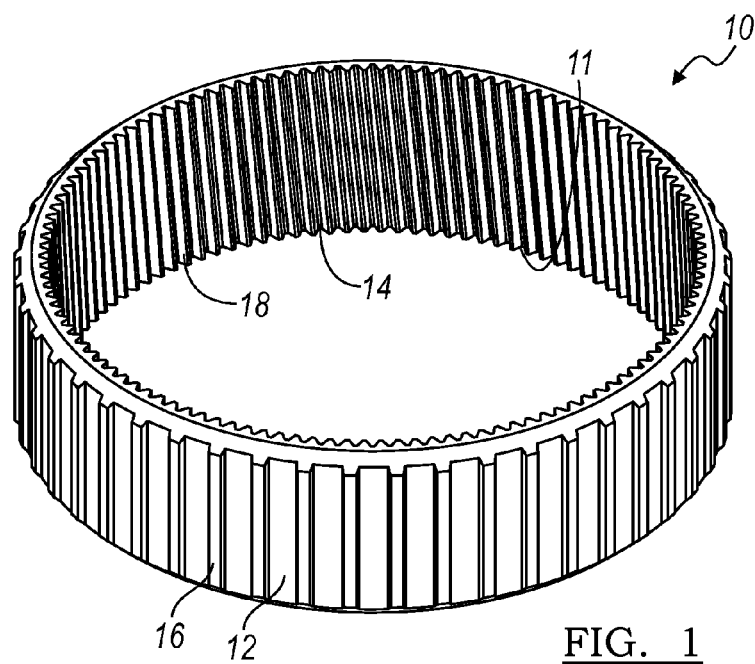
FIG. 1 is a perspective view of an exemplary gear manufactured according to the principles of the present invention.

Referring now to FIG. 1, an exemplary ring gear is designated by the reference number 10. The ring gear 10 is generally annular in shape and defines an annular cavity 11. The ring gear 10 further includes an outer surface 12 and an inner surface 14. A plurality of outer members or splines 16 are formed on the outer surface 12 along the outer diameter of the ring gear 10. A plurality of inner members or gear teeth 18 are formed on the inner surface 14 along the inner diameter of the ring gear 10. The gear teeth 18 are formed at an angle with respect to the splines 16. The gear teeth 18 and splines 16 typically cooperate with other splines and gear teeth on other gears (not shown) to form gear sets operable to transmit torque. However, it should be appreciated that the ring gear 10 may be employed in any environment without departing from the scope of the present invention. Moreover, types of gears other than ring gears may be employed without departing from the scope of the present invention.

Figure 2:
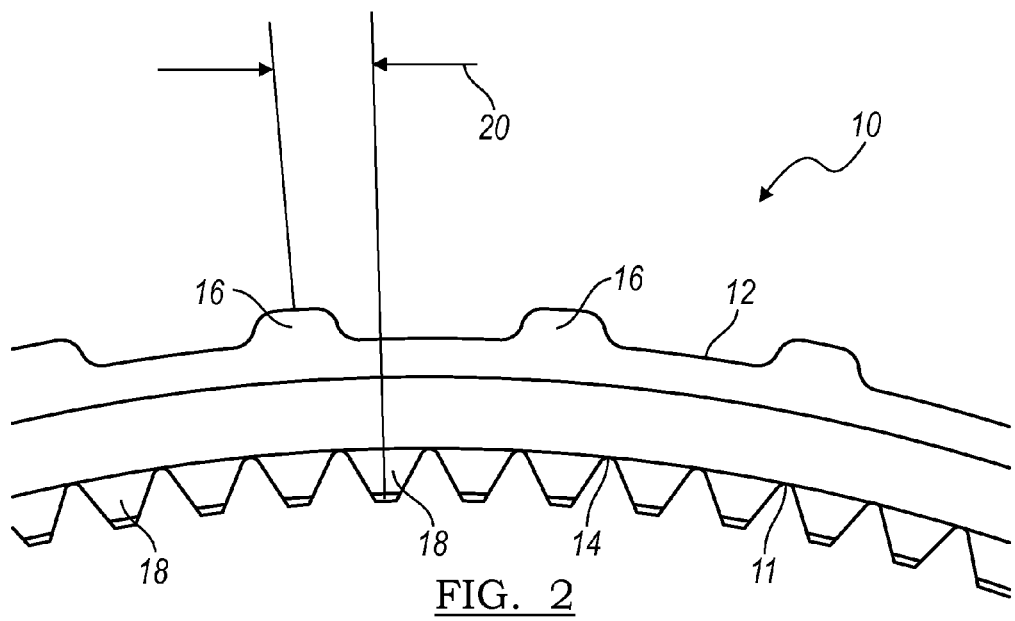
FIG. 2 is an enlarged schematic side view of a portion of the exemplary gear manufactured according to the principles present invention.

With reference to FIG. 2, the gear teeth 18 are radially spaced with respect to the splines 16 by a radial orientation distance, indicated by reference number 20. The radial orientation 20 is measured from a center of one spline 16 to a center of one gear tooth 18, either measured as a circumferential distance or as an angle. For example, the radial orientation 20 may be measured as an angle between a radial line from the center of the spline 16 to the center of the gear 10 and a radial line from the center of the gear tooth 18 to the center of the gear 10. In the particular example provided, the radial orientation 20 is measured between adjacent splines 16 and gear teeth 18, but it should be appreciated that the radial orientation 20 may be measured from any particular spline 16 and gear tooth 18 so long as the specific spline 16 and gear tooth 18 are employed consistently throughout the manufacture of the ring gear 10, as will be described in greater detail below. The amount of the radial orientation 20 is governed by the specific parameters that describe the environment in which the ring gear 10 is to be employed. While in the specific example provided the ring gear 10 has inner gear teeth and outer splines, it should be appreciated that the present invention may be used to manufacture a ring gear having various combinations of inner and outer features such as outer gear teeth and inner splines, outer gear teeth and inner gear teeth, and outer splines and inner splines, each having specific radial orientations between the inner and outer features.

Figure 3A:
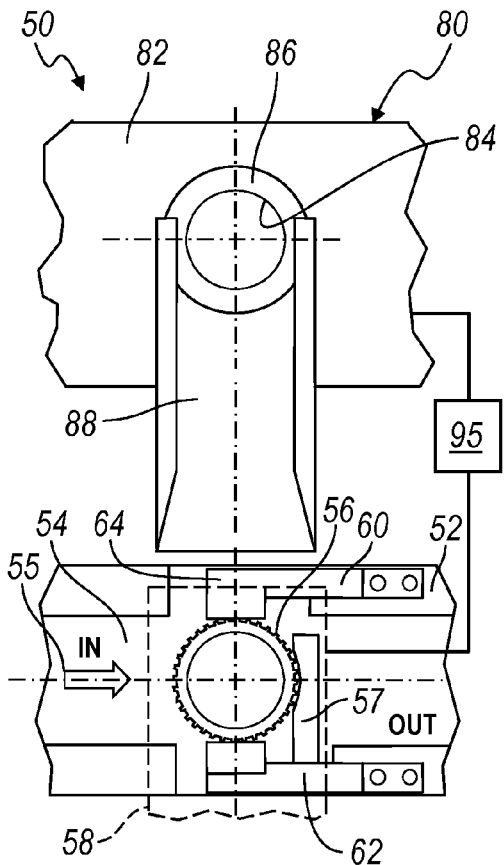
FIG. 3A is a schematic top view of a gear cutting system of the present invention in a first position.

Turning now to FIG. 3A, a gear cutting system for manufacturing the ring gear 10 having a specific radial orientation 20 described above is generally indicated by reference number 50. The gear cutting system 50 includes a loading station 52. The loading station 52 includes a conveyor 54 used to position a workpiece 56 underneath an orientation device 58. The workpiece 56 is similar to the ring gear 10 (FIG. 1) and includes the splines 16 formed on the outer surface 12, an annular cavity 11, and an inner surface 14. However, the gear teeth 18 have not yet been formed on the inner surface 14 of the workpiece 56.

The gear cutting system 50 also includes a shuttle loader 60, only part of which is shown. The shuttle loader 60 is positioned underneath the orientation device 58 and above the loading station 52. The shuttle loader 60 includes a first arm 62 and a second arm 64. The first arm 62 and the second arm 64 are coupled to a housing (not shown) of the shuttle loader 60. The arms 62 and 64 cooperate to grip the workpiece 56, as will be described in greater detail below.

Figure 3C:
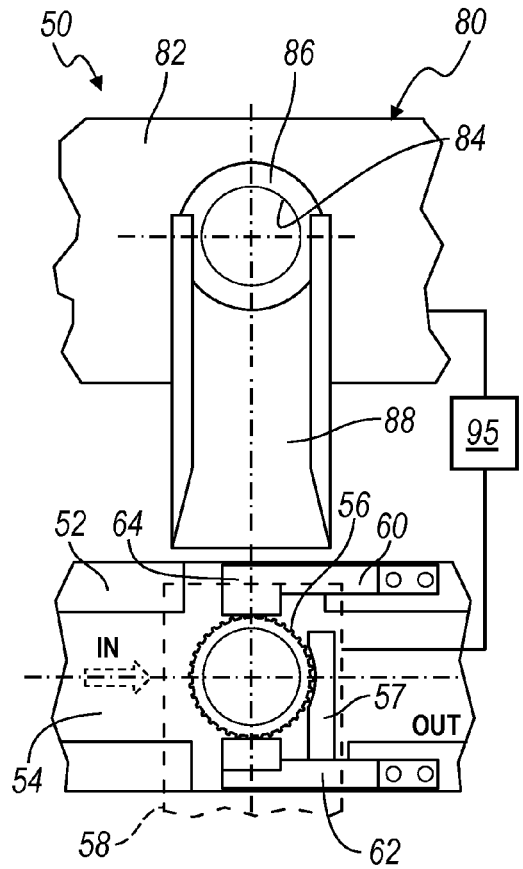
FIG. 3C is a schematic top view of the gear cutting system of the present invention in a second position.
Figure 3B:
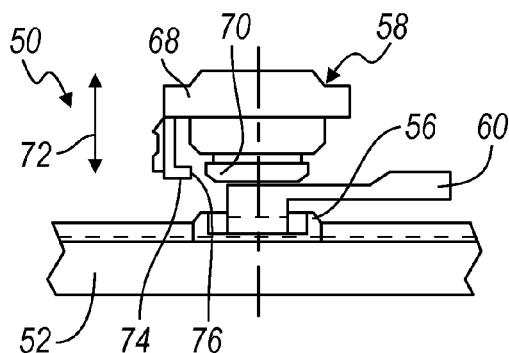
FIG. 3B is a schematic side view of the gear cutting system of the present invention in the first position.

With reference to FIG. 3B, the orientation device 58 is, as noted above, positioned above the loading station 52. The orientation device 58 includes a housing 68 having a hub 70 that extends towards the workpiece 56. The hub 70 is moveable in an axial direction, as shown by the arrows indicated by reference number 72. The hub 70 is sized to fit within the annular cavity 11 of the workpiece 56.

A sensor arm 74 extends out from the housing 68 parallel to the hub 70 towards the workpiece 56 and loading station 52. A sensor 76 is located at an end of the sensor arm 74. The sensor 76 is positioned such that the sensor 76 is directed towards the hub 70. The sensor 76 is preferably an optical sensor, though various other kinds of sensors may be employed. As will be described in further detail below, the sensor 76 is operable to detect the splines 16 of the workpiece 56.

Turning back to FIG. 3A, the gear cutting system 50 further includes a cutting machine or station 80. The cutting station 80 is operable to form the gear teeth 18 on the inner surface 14 of the workpiece 56, as will be described in greater detail below. The cutting station 80 generally includes a work surface 82, only part of which is shown. A cutting hole 84 is formed in the work surface 82. An annular ring 86 is located around the cutting hole 84. The annular ring 86 extends out from the work surface 82 and is sized to receive the workpiece 56 thereon. A loading ramp 88 extends from the cutting hole 84 out towards the loading station 52.

The cutting system 50 further includes a controller 95. The controller 95 is preferably an electronic device having a pre-programmed digital computer or processor, control logic, memory used to store data, and at least one I/O peripheral. However, other types of controllers may be employed without departing from the scope of the present invention. The controller 95 is in communication with the orientation device 58, the sensor 76, and the cutting station 80. More specifically, the controller 95 is configured to receive data signals from the 76 and to send control signals to the orientation device 58 and the cutting station 80.

With reference to FIGS. 3A-3F, a method for manufacturing the ring gear 10 using the gear cutting system 50 will now be described. First, the workpiece 56 is positioned by the conveyor 54 in the direction of the arrows indicated by reference number 55 such that the workpiece 56 is positioned underneath the orientation device 58 as seen in FIGS. 3A and 3B. A stop 57 coupled to the loading station 52 operates to position the workpiece 56 underneath the orientation device 58.

Figure 3D:
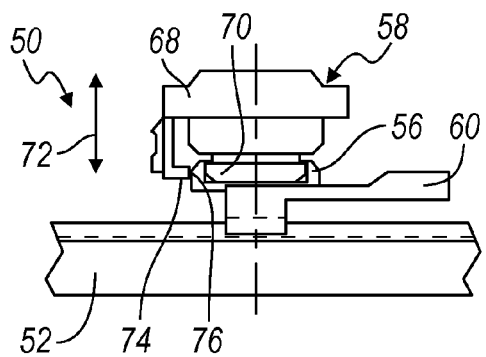
FIG. 3D is a schematic side view of the gear cutting system of the present invention in the second position.

Next, the orientation device 58 picks up the workpiece 56 as seen in FIGS. 3C and 3D. More specifically, the hub 70 of the orientation device 58 extends down into the annular cavity 11 of the workpiece 56 such that the hub 70 creates an interference fit with the workpiece 56. The hub 70 then extends back up towards the housing 68 carrying the workpiece 56 such that the workpiece 56 is positioned opposite the sensor 76. The sensor 76 scans the workpiece 56 and detects the position of at least one of the splines 16. The position of the splines 16 is communicated to the controller 95. The controller 95 determines an amount of rotation necessary to position the workpiece 56 relative to the cutting station 80 such that when the inner teeth 18 are cut into the gear 10, the inner teeth 18 will have the desired radial orientation 20. The hub 70 of the orientation device 58 then rotates the workpiece 56 relative to the cutting station 80 the amount determined by the controller 95. The orientation device 58 then lowers the workpiece 56 back onto the loading station 52. The arms 60 and 62 of the shuttle loader 60 then grip the workpiece 56 and keep the workpiece 56 stationary.

Figure 3E:
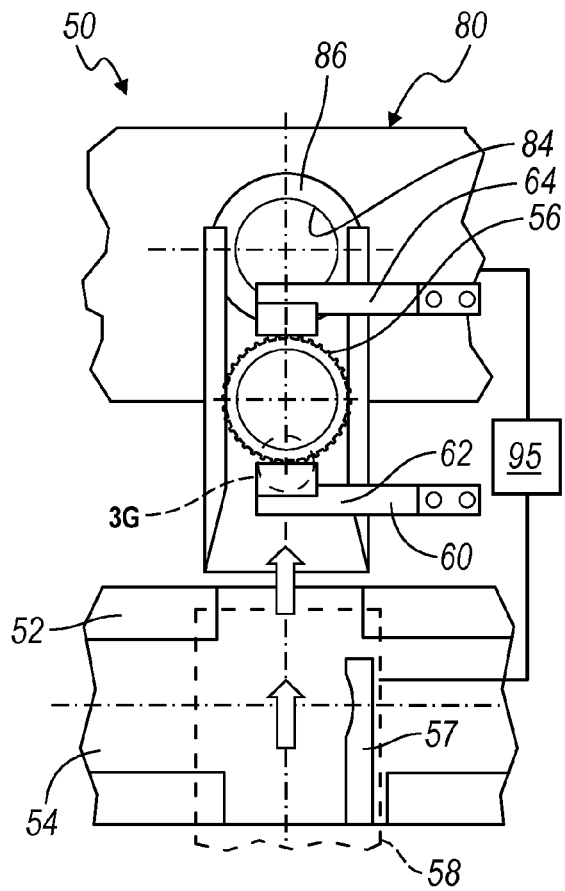
FIG. 3E is a schematic top view of the gear cutting system of the present invention in a third position.
Figure 3G:
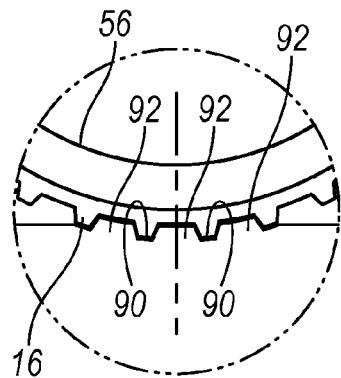
FIG. 3G is an enlarged schematic view of a portion of the gear cutting system of the present invention.
Figure 3F:
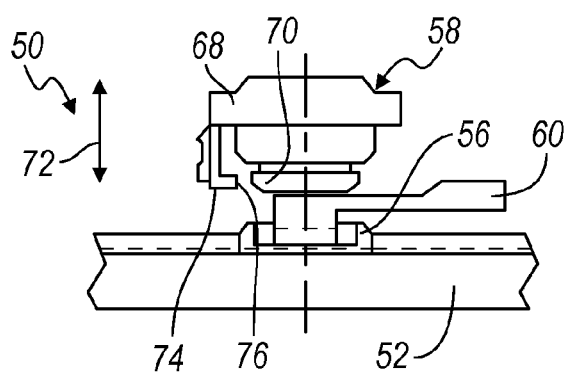
FIG. 3F is a schematic side view of the gear cutting system of the present invention in the third position.

Once the workpiece 56 has been oriented with respect to the cutting station 80, the shuttle loader 60 transfers the workpiece 56 onto the loading ramp 88 towards the cutting station 80, as seen in FIGS. 3E and 3F. The radial orientation of the workpiece 56 is maintained during this transfer by a plurality of notches 90 and teeth 92 located on the first arm 62 of the shuttle loader 60. These notches 90 and teeth 92 cooperate with the splines 16 formed on the workpiece 56 to keep the workpiece 56 from rotating during the transfer from the loading station 52 to the cutting station 80.

Turning now to FIGS. 4A and 4B, the workpiece 56 is positioned atop the annular ring 86 by the shuttle loader 60 such that the annular cavity 11 of the workpiece 56 is concentric with the cutting hole 84 of the cutting station. The cutting station 80 further includes a cutting tool 100 that is used to form the gear teeth 18 (FIG. 1) on the workpiece 56.

With reference to FIGS. 5A and 5B, the cutting tool 100 includes a generally cylindrical body 102 having a head portion 104. The head portion 104 includes an inclined pulling face 106. The inclined pulling face 106 acts as a locator during the cutting process along the axis of the cutting hole 84. The head portion 104 further includes drive flats 107 formed thereon. The drive flats 107 are gripped by a driver (not shown) that rotates and moves the cutting tool 100 during the cutting process. The cylindrical body 102 also includes a tooth cutting portion 108 at an end opposite the head portion 104. The tooth cutting portion 108 includes a plurality of tooth cutting rows or edges 110. The distance between the inclined pulling face 106 and the first row of the tooth cutting rows 110 is used to control the axial position of the cutting tool 100 relative to the workpiece 56. Additionally, the radial distance between the drive flats 107 and the tooth cutting rows 110 is used to control the radial position of the cutting tool 100 relative to the workpiece 56.

Turning back to FIGS. 4A and 4B, the cutting tool 100 extends through the annular cavity 11 and the cutting hole 84. The cutting tool 100 is rotated and positioned by a driver (not shown) that is controlled by control signals communicated from the controller 95. The controller 95 preferably employs computer numerical control (CNC) helix generation axis software or control logic to rotate and position the cutting tool 100 relative to the workpiece 56 prior to the cutting of the gear teeth 18 by the cutting tool 100. The controller 95 controls the radial orientation of the cutting tool 100 and the workpiece 56. The controller 95 uses the known orientation or rotational position of the workpiece 56, the known axial distance of the tooth cutting rows 110 relative to the inclined pulling face 106, and the known rotational position of the tooth cutting rows 110 relative to the drive flats 107 to rotationally position the cutting tool 100 relative to the workpiece 56 prior to cutting. By knowing the orientation of the splines 16 relative to the cutting tool 100 and controlling when the cutting tool 100 begins formation of the inner gear teeth 18 (FIG. 1), the radial orientation 20 between the spines 16 and the gear teeth 18 can be specifically set.

Once the cutting tool 100 has been properly positioned relative to the workpiece 56 to create the desired radial orientation 20, the cutting tool 100 is rotated and moved by the driver (not shown) and the tooth cutting rows 110 cut the gear teeth 18 (FIG. 1) into the inner surface 14 of the workpiece 56. When the gear teeth 18 have been formed into the workpiece 56, the cutting tool 100 is retracted, the workpiece 56 is transferred by the shuttle loader 60 back to the loading station 52 where the workpiece 56 is removed from the gear cutting system 50 by the conveyor 54.

Figure 6A:
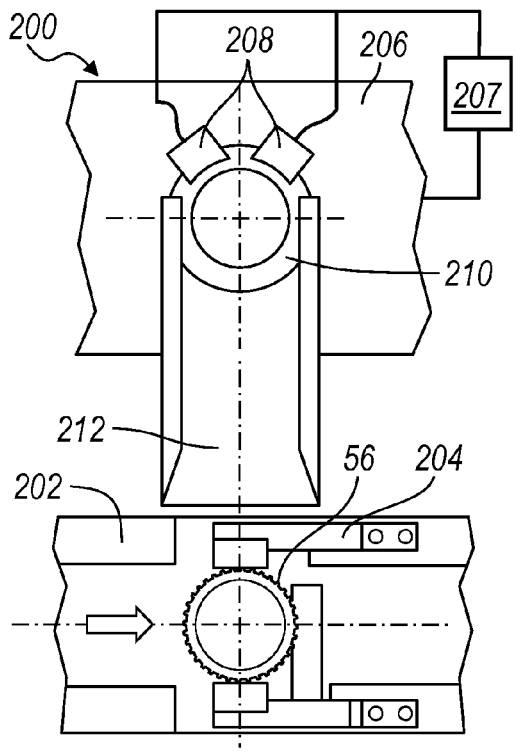
FIG. 6A is a top schematic view of a gear cutting system in a first position according to another embodiment of the present invention.
Figure 6B:
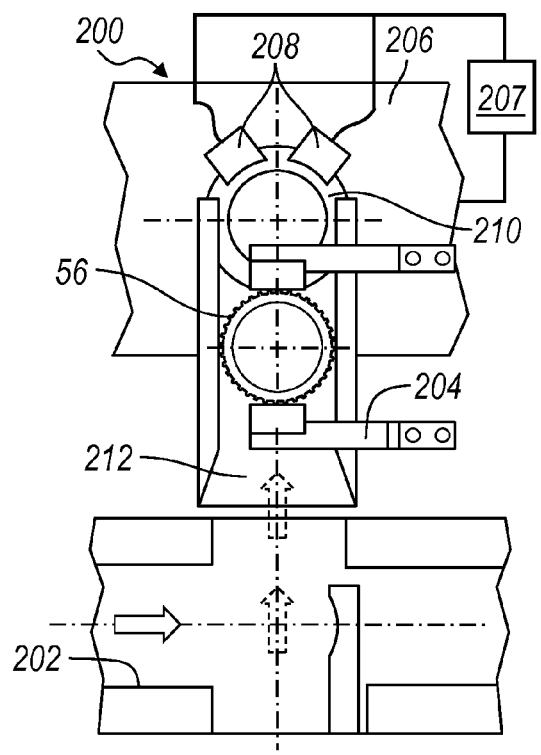
FIG. 6B is a top schematic view of the gear cutting system in a second position according to another embodiment of the present invention.
Figure 6C:
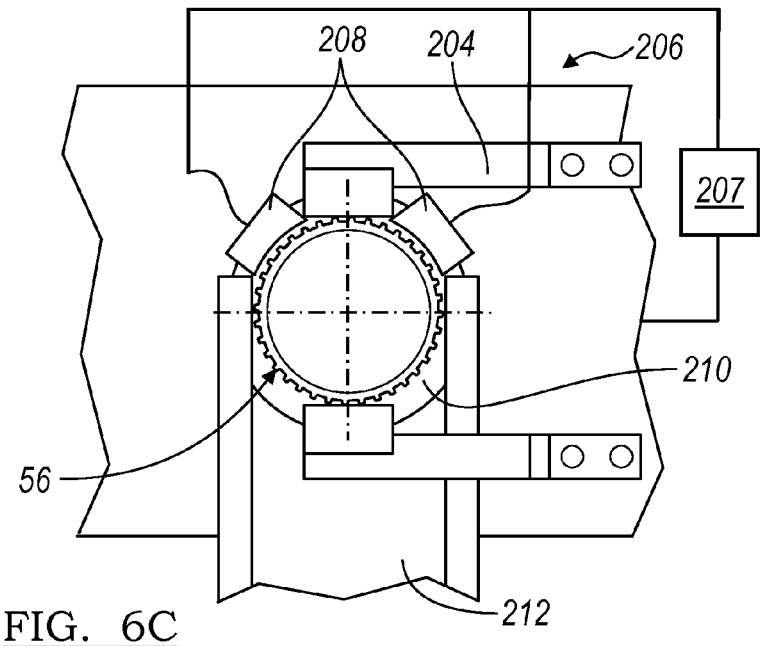
FIG. 6C is an enlarged top schematic view of a cutting station employed in an embodiment of the gear cutting system according to the second embodiment of the present invention.

Turning now to FIGS. 6A-C, a second gear cutting system is generally indicated by reference number 200. The second gear cutting system 200 is similar to the gear cutting system 50 and includes a loading station 202, a shuttle loader 204, a cutting station 206, and a controller 207. However, the second gear cutting system 200 does not include the orientation device 58. Instead, the second gear cutting system 200 includes a plurality of sensors 208 mounted on an annular ring 210. The sensors 208 are in communication with the controller 207. While in the particular example provided two sensors 208 are employed, it should be appreciated that any number of sensors 208 may be used without departing from the scope of the present invention.

The method of manufacturing the ring gear 10 using the second gear cutting system 200 begins as the workpiece 56 is positioned by the loading station 202 into the shuttle loader 204, as shown in FIG. 6A. Next, the shuttle loader 204 grips the workpiece 56 and moves the workpiece 56 onto a loading ramp 212 of the cutting station 206, as shown in FIG. 6B. Finally, the workpiece 56 is positioned onto the annular ring 210 of the cutting station 206, as shown in FIG. 6C. The sensors 208 are positioned such that they are able to sense or scan the orientation or rotational position of the outer splines 16 of the workpiece 56. The controller 207 then determines an amount of rotation necessary to create the desired radial orientation 20 based on the rotational position of the outer splines 16 and the rotational position of the cutting rows 110 on the cutting tool 100. The controller 207 then rotates the cutting tool 100 the determined amount necessary to create the radial orientation 20 between the outer splines 16 and the inner gear teeth 18. Cutting of the inner gear teeth 18 then proceeds in a manner similar to that described for the gear cutting system 50.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for forming a feature on an inner surface of a gear, the system comprising:
   a cutting device having a cutting edge for forming the feature in the inner surface of the gear;
   a sensor for detecting a feature on an outer surface of the gear; and
   a controller in communication with the sensor and the cutting device, the controller having a first control logic for determining the angular orientation about a center axis of the gear of the feature on the outer surface of the gear with respect to the cutting edge, a second control logic for determining an amount of rotation required to position the cutting edge and the feature on the outer surface of the gear at a desired orientation, a third control logic for rotating at least one of the cutting edge and the gear the amount required to orient the cutting edge and the gear to the desired orientation, and a fourth control logic to move the cutting edge through the gear such that the cutting edge forms at least one feature into the inner surface of the gear, wherein the at least one feature on the inner surface is positioned relative to the feature on the outer surface at the desired orientation.

2. The system of claim 1 wherein the cutting edge is rotated relative to the gear in order to orient the cutting edge relative to the feature on the outer surface of the gear to the desired orientation.

3. The system of claim 2 wherein the cutting edge is located on a cutting tool, the cutting tool having a locating feature positioned at a fixed orientation relative to the cutting edge, and the first control logic determines the angular orientation of the feature on the outer surface of the gear with respect to the cutting edge by determining the orientation of the locating feature with respect to the feature on the outer surface of the gear, and the second control logic determines the amount of rotation required to position the cutting edge and the feature on the outer surface of the gear at the desired orientation by using the fixed orientation of the locating feature relative to the cutting edge to determine the amount of rotation.

4. The system of claim 3 wherein the cutting device includes a base having a hole sized to receive the cutting tool therethrough, and the sensor is connected to the cutting device proximate the hole.

5. The system of claim 1 further comprising an orientation device having an extendable hub, wherein the extendable hub is operable to contact the gear and rotate the gear relative to the cutting device the amount of rotation required to orient the gear with respect to the cutting edge.

6. The system of claim 5 wherein the sensor is connected to the orientation device.

7. The system of claim 6 further comprising a loader having a toothed portion operable to engage the feature on the outer surface of the gear, wherein the loader is operable to move the gear from the orientation device to the cutting device while maintaining the orientation of the gear relative to the cutting device.

8. The system of claim 1 wherein the desired orientation is determined by a measurement from a center of the feature on the outer surface of the gear to the cutting edge.

9. The system of claim 1 wherein the desired orientation is determined by a measurement of an angle between a radial line extending from a center of the gear to the center of the feature on the outer surface of the gear and a radial line extending from the center of the gear to a center of the feature on the inner surface of the gear.

10. The system of claim 1 wherein the feature on the outer surface of the gear is at least one of a spline and a gear tooth and wherein the feature on the inner surface of the gear is at least one of a spline and a gear tooth.

* * * * *